US007582232B1

(12) United States Patent
Burrell et al.

(10) Patent No.: US 7,582,232 B1
(45) Date of Patent: Sep. 1, 2009

(54) LOW TEMPERATURE ROUTE TO URANIUM NITRIDE

(75) Inventors: Anthony K. Burrell, Los Alamos, NM (US); Alfred P. Sattelberger, Darien, IL (US); Charles Yeamans, Berkeley, CA (US); Thomas Hartmann, Idaho Falls, ID (US); G. W. Chinthaka Silva, Las Vegas, NV (US); Gary Cerefice, Henderson, NV (US); Kenneth R. Czerwinski, Henderson, NV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 281 days.

(21) Appl. No.: 11/739,147

(22) Filed: Apr. 24, 2007

(51) Int. Cl.
  *G21C 3/02* (2006.01)
  *G21C 3/42* (2006.01)
  *C01G 43/00* (2006.01)
  *C01B 21/06* (2006.01)

(52) U.S. Cl. ..................................... 252/641; 423/254
(58) Field of Classification Search ................. 252/641; 423/254
See application file for complete search history.

(56) References Cited

U.S. PATENT DOCUMENTS

| 3,953,355 A | 4/1976 | Potter et al. |
| 5,128,112 A | 7/1992 | Van Der Sluys et al. |
| 2005/0286676 A1* | 12/2005 | Lahoda et al. ............... 376/411 |

FOREIGN PATENT DOCUMENTS

GB  1186630  4/1970

OTHER PUBLICATIONS

Szakaly, "Assessment Of Uranium-Free Nitride Fuels For Spent Fuel Transmutation In Fast Reactor Systems," Thesis submitted to the Office of Graduate Studies of Texas A&M University in partial fulfillment of the requirements for the degree of Master of Science, May 2004.
Ward et al., "High Temperature Vaporization And Raoult's-Law Studies With $^{243}$Am Metal$^a$," J. Chem. Phys., Nov. 15, 1979, pp. 3920-3925, vol. 71, No. 10.
Akabori et al., "Nitride Fuel And Pyrochemical Process Developments For Transmutation Of Minor Actinides In Jaeri," Japan Atomic Energy Research Institute, Japan.
Streit et al., "Nitrides As A Nuclear Fuel Option," Journal of the European Ceramic Society, 2005, pp. 2687-2692, vol. 25.
Masaki et al., "The Structure Of $\beta$-$U_2N_3$," Journal of Nuclear Materials, 1975, pp. 241-243, vol. 58.
Wani et al., "Fluorination Of Oxides Of Uranium And Thorium By Ammonium Hydrogenfluoride," Journal of Fluorine Chemistry, 1989, pp. 177-185, vol. 44.
Tanaka et al., "Fission Gas Release And Swelling In Uranium-Plutonium Mixed Nitride Fuels," Journal of Nuclear Materials, 2004, pp. 77-87, vol. 327.

* cited by examiner

*Primary Examiner*—Mark Eashoo
*Assistant Examiner*—Peter F Godenschwager
(74) *Attorney, Agent, or Firm*—Thomas S. O'Dwyer; Paul A. Gottlieb

(57) ABSTRACT

A method of preparing an actinide nitride fuel for nuclear reactors is provided. The method comprises the steps of a) providing at least one actinide oxide and optionally zirconium oxide; b) mixing the oxide with a source of hydrogen fluoride for a period of time and at a temperature sufficient to convert the oxide to a fluoride salt; c) heating the fluoride salt to remove water; d) heating the fluoride salt in a nitrogen atmosphere for a period of time and at a temperature sufficient to convert the fluorides to nitrides; and e) heating the nitrides under vacuum and/or inert atmosphere for a period of time sufficient to convert the nitrides to mononitrides.

18 Claims, 1 Drawing Sheet

LOW TEMPERATURE ROUTE TO URANIUM NITRIDE

GOVERNMENT INTEREST

The United States Government, as represented by the Department of Energy, has a paid-up license in the invention described and may manufacture and/or use this invention for governmental purposes in accordance with the terms of Contract No. DE-AC52-06NA25396.

FIELD OF THE INVENTION

This invention relates to a low temperature process for preparing actinide nitrides, for use as fuel in nuclear reactors.

BACKGROUND OF THE INVENTION

With the increasing demand for energy and the pressing issues associated with CO2 emissions, nuclear power is once again becoming an attractive alternative for electrical production. The generation-IV reactors which are under development will run at much higher temperatures and with a much greater burn-up of the fuel than the current generation of nuclear reactors. A consequence of this higher working temperature and greater burn-up is a need for new fuel formulations.

There are many materials that may fit the requirements of the generation-IV reactors. Oxides are relatively simple to produce and are the current materials of choice for conventional reactors. Unfortunately, oxide fuels have several inherent limitations, which include a relatively low fissile density that reduces the breeding ratio and poor thermal conductivity that restricts the linear heating rate. Of the alternatives, nitrides represent the best combination of properties with the potential to solve these problems.

Uranium nitride has many favorable fuel properties, such as a high fissile density, a high melting point similar to that of oxide fuel and high thermal conductivity similar to that of metal fuel. While uranium nitride (UN) has many of the properties that would make it an excellent reactor fuel, it has failed to make the leap to practical systems due to the difficulty in its synthesis. In particular, the inclusion of carbon from the currently favored carbothermic reduction routes to UN is a major issue in the production of nitride fuels. The carbothermic synthesis relies on the conversion of the uranium carbide to the nitride at high temperatures. The high temperatures required for the UN production have unfortunate side effects in that the low vapor-pressure actinides, particularly americium, become volatile leading to serious contamination issues.

GB 1,186,630 discloses a process for the production of uranium nitride, plutonium nitride, or mixtures thereof, by reaction of uranium or plutonium tetrafluorides or trifluorides by high-temperature ammonolysis into the corresponding higher nitride or mixture of higher nitrides, which is then dissociated in vacuo into the corresponding mononitride or mixture of mononitrides. Optionally, zirconium nitride can be included in the admixture.

U.S. Pat. No. 3,953,355 discloses a process for the preparation of actinide nitrides from massive actinide metal, massive being a single piece of metal having a mass of 0.1 kg or more. The process involves partially hydriding the massive metal and simultaneously dehydriding and nitriding the dehydrided portion. The process is repeated until all of the massive metal is converted to a nitride.

U.S. Pat. No. 5,128,112 discloses a process of preparing an actinide nitride, phosphide, sulfide or oxide, by admixing an actinide organometallic precursor with a suitable solvent and a protic Lewis base selected from ammonia, phosphine, hydrogen sulfide and water, and heating the mixture until the actinide compound is formed.

B. N. Wani et al. report in *Fluorination of Oxides of Uranium and Thorium by Ammonium Hydrogen Fluoride. J. Fluorine Chem.* 44 (1989) 177-185, that $UO_2$, $U_3O_8$ and $ThO_2$ were fluorinated by $NH_4HF_2$ at room temperature to produce $(NH_4)_4UF_8 \cdot 2H_2O$, $(NH_4)_3UO_2F_5 \cdot H_2O$ and $(NH_4)_4ThF_8 \cdot 2H_2O$, respectively.

There remains a need to provide low temperature methods of preparing actinide nitrides for use as nuclear fuels.

SUMMARY OF THE INVENTION

Accordingly, the present invention provides a method of preparing an actinide nitride fuel for nuclear reactors comprising the steps of: a) providing at least one actinide oxide and optionally zirconium oxide; b) mixing the oxide or oxides with a source of hydrogen fluoride for a period of time and at a temperature sufficient to convert the oxide to a fluoride salt; c) heating the fluoride salt to remove water; d) further heating the fluoride salt in a nitrogen atmosphere for a period of time and at a temperature sufficient to convert the fluoride salt to nitride; and e) heating the nitride under vacuum and/or inert atmosphere for a period of time and at a temperature sufficient to convert the nitride to mononitride.

The present invention provides a process for producing actinide nitrides such as uranium nitride at temperatures of 1100° C. or less without carbon contamination. The method utilizes the simple conversion of oxides to fluorides and their subsequent conversion to nitrides. The process does not rely on any significant change in oxidation state of the uranium and hence does not employ carbothermic reduction.

BRIEF DESCRIPTION OF THE DRAWINGS

The invention is further illustrated by the following drawing in which.

DETAILED DESCRIPTION OF THE INVENTION

Figure 1:
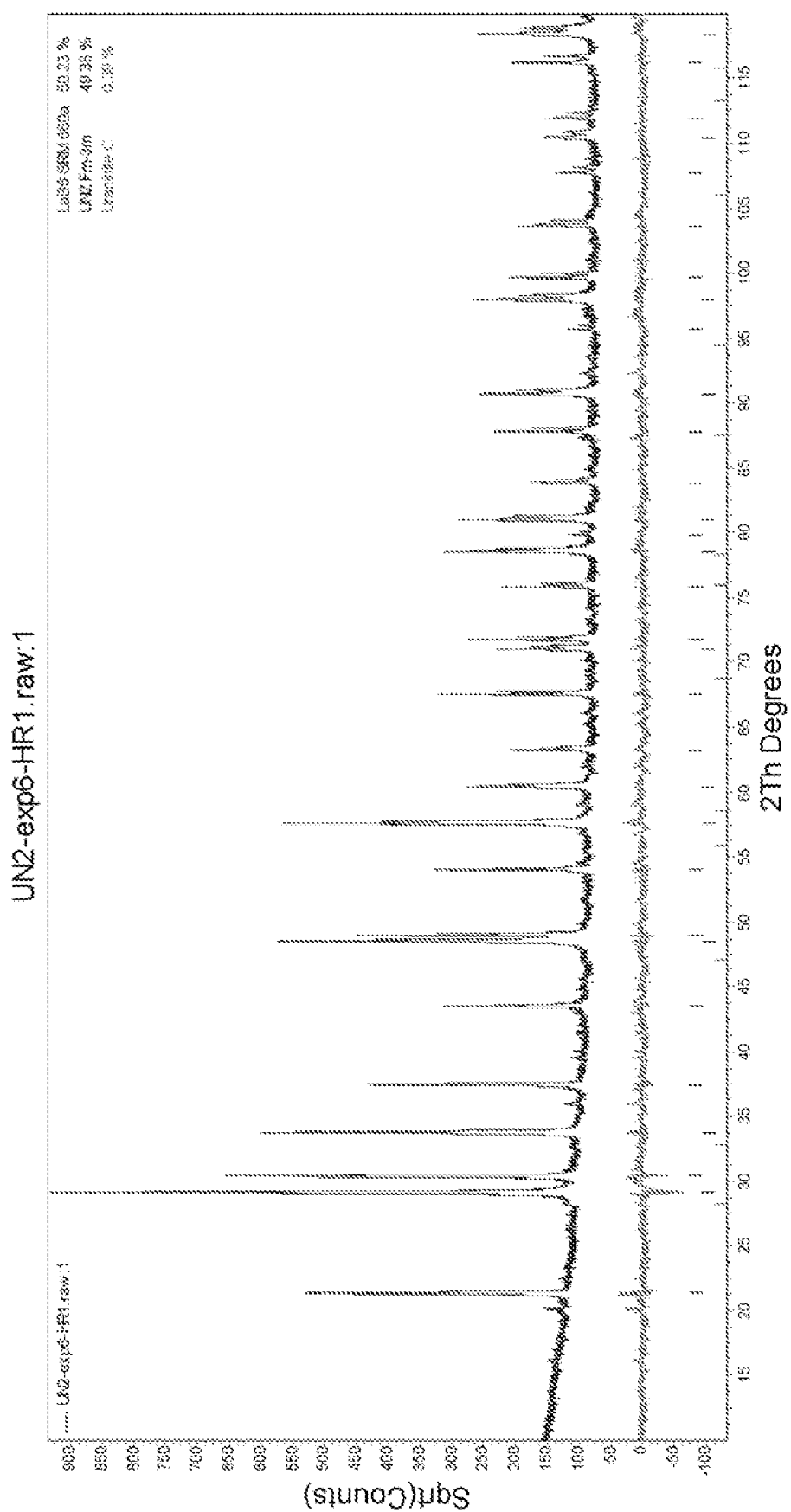
FIG. 1 is a line graph of x-ray diffraction data for $UN_2$.

As used herein, unless otherwise expressly specified, all numbers such as those expressing values, ranges, amounts or percentages may be read as if prefaced by the word "about," even if the term does not expressly appear. Any numerical range recited herein is intended to include all sub-ranges subsumed therein. Plural encompasses singular and vice versa.

Actinide series elements are the fifteen chemical elements that lie between actinium and lawrencium on the periodic table, with atomic numbers 89-103. Suitable actinides for use in nuclear fuels include, for example, thorium, uranium, plutonium, neptunium, americium and curium. Mixtures of two or more actinide oxides are preferred, such as mixtures of plutonium and uranium. Mixtures of three or more actinides can also be used, such as mixtures of plutonium, uranium and thorium. Especially preferred are mixtures of oxides of thorium, uranium, plutonium, neptunium, americium and curium; plutonium, neptunium, americium and curium; and uranium, plutonium, neptunium, americium and curium. In any of the above mixtures, the relative amount of each actinide may vary from 0.01-100% in the mixture.

Optionally, zirconium oxide can be added to the actinide oxide in amounts known in the art. Zirconium oxide is a well known stabilizer for nuclear fuels and is also used for cladding the fuel pellets. As used throughout the specification and claims, "oxide" or "oxides" refers to the at least one actinide oxide, which is optionally mixed with zirconium oxide. The process of the present invention thus produces at least one actinide mononitride, which is optionally mixed with zirconium mononitride.

The actinide oxide or oxides are mixed with a source of hydrogen fluoride for a period of time and at a temperature sufficient to convert the oxide to a fluoride salt, according to the following reaction (where "Act" denotes actinide):

$$ActO_2 + 4NH_4HF_2 \rightarrow (NH_4)_4ActF_8 \cdot 2\, H_2O \qquad (1)$$

Suitable sources of hydrogen fluoride include, for example, ammonium bifluoride, ammonium fluoride and combinations of these. Preferably, the ammonium bifluoride and/or ammonium fluoride is enriched to at least 50% $^{15}N$, with higher levels more preferred. The reaction of the oxide with hydrogen fluoride can be carried out at ambient temperature, at temperatures between 20°–30° C. As the temperature is increased to about 50° C. the salt is dried and water is driven off:

$$(NH_4)_4ActF_8 \cdot 2\, H_2O \rightarrow (NH_4)_4ActF_8 + 2\, H_2O \qquad (2)$$

Following removal of water, fluoride salt is further heated in a nitrogen atmosphere for a period of time and at a temperature sufficient to convert the fluoride salt to nitride:

$$(NH_4)_4ActF_8 + 2NH_3 \rightarrow ActN_2 + 4NH_4F + H_2 \qquad (3)$$

Preferably, the nitrogen atmosphere is ammonia. 100% ammonia is preferable for rate optimization, however ammonia as a percentage in any inert carrier gas will work. The temperature used in this step of the process is between 600°–1000° C., more preferably 750°–850° C., and the period of time sufficient to complete the reaction is between 15 minutes to 3 hours, more preferably 30 minutes to 2 hours.

After conversion to the nitride, the at least one actinide nitride (and optionally zirconium nitride) is heated under vacuum and/or inert atmosphere for a period of time and at a temperature sufficient to convert the actinide nitride to a mononitride:

$$ActN_2 \rightarrow ActN + \tfrac{1}{2}N_2 + H_2 + 2H_2O \qquad (4)$$

This is accomplished at temperatures between 1000°–1300° C., more preferably at temperatures between 1050°–1200° C. Complete 100% conversion to the mononitride occurs within ten hours, usually within 3–5 hours.

EXAMPLE $UO_2$ was reacted with $NH_4HF_2$ to give $(NH_4)_4UF_8$ on a 50 g scale with a 10% excess of $NH_4HF_2$. Analysis of the bright green material indicates that it was mainly $(NH_4)_4UF_8$ with small amounts of $\alpha$-$(NH_4)_2UF_6$ and $\gamma$-$(NH_4)_2UF_6$.

By washing the green material with large amounts of water, the reaction was completed and $(NH_4)_4UF_8 \cdot 2H_2O$ was obtained as the exclusive product, with no impurities detected. The hydrate was dried at 50° C. to give $(NH_4)_4UF_8$ in quantitative yield (100% yield).

When the $(NH_4)_4UF_8$ was heated to 800° C. under $NH_3$, a quantitative conversion from $(NH_4)_4UF_8$ to a uranium nitride, which analyzed as $UN_2$, occurred.

For the $UN_2$, x-ray diffraction patterns (shown in FIG. 1) can be indexed as cubic, with a=5.305034(30) Å. The Rietveld Refinement (see Table 3, below) confirmed the product as $UN_2$ with a small impurity (0.7%) consisting of $UO_2$.

While $UN_2$ has been previously characterized, it is one of the rarer uranium nitrides with very few reports describing its preparation or properties.

The EXAFS spectrum also confirmed the known $UN_2$ structure and lattice parameters and are presented in Table 2.

An examination of the thermal stability of $UN_2$ using thermogravimetric analysis (TGA) indicated that a significant weight loss occurs at 1000° C. Heating the $UN_2$ to 1100° C. resulted in the complete conversion to UN within 2 hours. The materials obtained for the thermal decomposition of $UN_2$ was cubic UN. The EXAFS spectrum fits the x-ray data and confirms the presence of the simple UN.

TABLE 1

Experimental Powder X-ray Diffraction Pattern of Uranium Dinitride

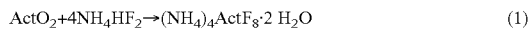

| hkl | d(A) | 2θ | calculated intensity | experimental intensity |
|---|---|---|---|---|
| 111 | 3.06379(2) | 29.12313 | 100 | 100 |
| 002 | 2.65332 | 33.75363 | 37.2 | 44.68 |
| 022 | 1.87618 | 48.48097 | 38.2 | 40.16 |
| 311 | 1.60001 | 57.55807 | 34.2 | 27.57 |
| 222 | 1.53189 | 60.37619 | 7.8 | 6.92 |
| 004 | 1.32666 | 70.98974 | 4.7 | 4.75 |
| 331 | 1.21743 | 78.50319 | 11.1 | 10.22 |
| 042 | 1.1866 | 80.95721 | 8.4 | 8.59 |

TABLE 2

Comparison of XRD and EXAFS Spectroscopy Results on Uranium Dinitride

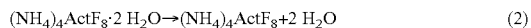

| Bond | EXAFS R ± 0.02 Å | C.N ± 20% | XRD* R ± 0.002 Å | C.N. |
|---|---|---|---|---|
| U-N1 | 2.28 | 7.5 | 2.299 | 8 |
| U-U1 | 3.73 | 12 | 3.754 | 12 |
| U-N2 | 4.38 | 24 | 4.402 | 24 |

TABLE 3

Rietveld Refinement, Experimental versus Calculated Fit

R-Values

| Rexp: 0.83 | Rwp: 9.19 | Rp: 7.10 | GOF: 11.07 |
|---|---|---|---|
| Rexp': 1.41 | Rwp': 15.58 | Rp': 16.25 | DW: 0.45 |

Quantitative Analysis—Rietveld

| Phase 1: "LaB6 SRM 660a" | 50.231(91)% |
|---|---|
| Phase 2: "UN2 Fm-3m" | 49.380(91)% |
| Phase 3: "Uraninite C" | 0.389(78)% |

Background

| Chebychev polynomial, Coefficient 0 | 9884(14) |
|---|---|
| 1 | −6544(24) |
| 2 | 3848(21) |
| 3 | −1595(21) |
| 4 | 710(17) |
| 5 | −179(16) |

Instrument

| Primary radius (mm) | 240 |
|---|---|
| Secondary radius (mm) | 240 |
| Receiving slit width (mm) | 0.0809(99) |
| Divergence angle (°) | 1.000(16) |
| Full Axial Convolution | |

TABLE 3-continued

Rietveld Refinement, Experimental versus Calculated Fit

| | | |
|---|---|---|
| Filament Length (mm) | 10 | |
| Sample Length (mm) | 20(11) | |
| Receiving Slit Length (mm) | 30(15) | |
| Primary Sollers (°) | 2.3 | |
| Secondary Sollers (°) | 2.3 | |
| Tube_Tails | | |
| Source Width (mm) | 0.092(55) | |
| Z1 (mm) | −0.04(38) | |
| Z2 (mm) | 0.345(31) | |
| Fraction | 0.121(43) | |
| Corrections | | |
| Zero Error | 0.0516(20) | |
| Specimen displacement | 0.0690(45) | |
| LP Factor | 0 | |
| Structure 1 | | |
| Phase name | LaB6 SRM 660a | |
| R-Bragg | 2.240 | |
| Spacegroup | Pm-3m | |
| Scale | 0.07313(20) | |
| Cell Mass | 203.778 | |
| Cell Volume (Å^3) | 71.83047 | |
| Wt %—Rietveld | 50.231(91) | |
| Crystallie Size | | |
| Cry Size Lorentzian (nm) | 307.8(34) | |
| Crystal Linear Absorption Coeff. (1/cm) | 1124.705 | |
| Crystal Density (g/cm^3) | 4.711 | |
| PVII peak type | | |
| FWHM = a + b/Cos(Th) + c Tan(Th) | | |
| a | 0.0013(86) | |
| b | 0.0009(91) | |
| c | 0.0068(33) | |
| Exponent m = 0.6 + ma + mb/Cos(Th) + mc/Tan(Th) | | |
| ma | 20(570) | |
| mb | 0(430) | |
| mc | 5(79) | |
| Lattice parameters | | |

| a(Å) | | | | 4.1569000 | | |
|---|---|---|---|---|---|---|
| Site | Np | x | y | z | Atom Occ | Beq |
| La1 | 1 | 0.00000 | 0.00000 | 0.00000 | La 1 | 0.7038 |
| B1 | 6 | 0.19587 | 0.50000 | 0.50000 | B 1 | 0.65(13) |

| | | |
|---|---|---|
| Structure 2 | | |
| Phase name | UN2 Fm-3m | |
| R-Bragg, | 6.256 | |
| Spacegroup | Fm-3m | |
| Scale | 0.006623(12) | |
| Cell Mass | 1064.164 | |
| Cell Volume (Å^3) | 149.3016(26) | |
| Wt %—Rietveld | 49.380(91) | |
| Crystallite Size | | |
| Cry Size Lorentzian (nm) | 207.1(16) | |
| Crystal Linear Absorption Coeff. (1/cm) | 3267.166(56) | |
| Crystal Density (g/cm^3) | 11.83568(20) | |
| PVII peak type | | |
| FWHM = a + b/Cos(Th) + c Tan(Th) | | |
| a | 0.0001(60) | |
| b | 0.0001(66) | |
| c | 0.0299(38) | |
| Exponent m = 0.6 + ma + mb/Cos(Th) + mc/Tan(Th) | | |
| ma | 0.0(17) | |
| mb | 0.05(59) | |
| mc | 1.70(96) | |
| Lattice parameters | | |

| a (Å) | | | | | 5.305034(30) | |
|---|---|---|---|---|---|---|
| Site | Np | x | y | z | Atom Occ | Beq |
| U1 | 4 | 0.00000 | 0.00000 | 0.00000 | U + 6 1 | 1 |
| N1 | 8 | 0.25000 | 0.25000 | 0.25000 | N 1 | 3.52(21) |

| | | |
|---|---|---|
| Structure 3 | | |
| Phase name | Uraninte C | |
| R-Bragg | 2.184 | |
| Spacegroup | Fm-3m | |
| Scale | 0.0000472(95) | |
| Cell Mass | 1080.105 | |
| Cell Volume (Å^3) | 162.38(24) | |
| Wt %—Rietveld | 0.389(78) | |
| Crystallite Size | | |
| Cry Size Lorentzian (nm) | 0(3600000) | |
| Crystal Linear Absorption Coeff. (1/cm) | 3010.5(45) | |
| Crystal Density (g/cm^3) | 11.045(16) | |
| PV_TCHZ peak type | | |
| U | 1.2(39) | |
| V | 0.4(26) | |
| W | −0.09(45) | |
| Z | 0 | |
| X | 0.0(12) | |
| Y | 0 | |
| Lattice parameters | | |

| a (Å) | | | | | 5.4556(27) | |
|---|---|---|---|---|---|---|
| Site | Np | x | y | z | Atom Occ | Beq |
| U1 | 4 | 0.00000 | 0.00000 | 0.00000 | U + 4 1 | 1 |
| O1 | 8 | 0.25000 | 0.25000 | 0.25000 | O−2 1 | 1 |

Very weak unknown peaks at dhkl × 4.403 Å, 5.486 Å, 2.496 Å.

Very weak unknown peaks at dhkl=4.403 Å, 5.486 Å, 2.496 Å.

Whereas particular embodiments of this invention have been described above for purpose of illustration, it will be evident to those skilled in the art the numerous variations of the details of the present invention may be made without departing from the invention as defined in the appended claims.

What is claimed is:

1. A method of preparing a nitride fuel for nuclear reactors comprising:
   a) providing at least one actinide oxide;
   b) mixing the oxide or oxides with a source of hydrogen fluoride that is enriched to at least 50% $^{15}$N for a period of time and at a temperature sufficient to convert the oxide to a fluoride salt;
   c) heating the fluoride salt to remove water;
   d) further heating the fluoride salt in a nitrogen atmosphere for a period of time and at a temperature sufficient to convert the fluoride salt to nitride; and
   e) heating the nitride under vacuum and/or inert atmosphere for a period of time and at a temperature sufficient to convert the nitride to mononitride.

2. The method of claim 1, wherein the hydrogen fluoride source is selected from the group consisting of ammonium bifluoride, ammonium fluoride and combinations thereof.

3. The method of claim 2, wherein the actinide oxide is optionally mixed with zirconium oxide.

4. The method of claim 1, wherein the at least one actinide oxide is selected from the group consisting of thorium, uranium, plutonium, neptunium, americium, and curium.

5. The method of claim 4, wherein the at least one actinide oxide is a mixture of oxides of plutonium and uranium.

6. The method of claim 4, wherein the at least one actinide oxide is a mixture of oxides of plutonium, uranium and thorium.

7. The method of claim 4, wherein the at least one actinide oxide is a mixture comprising oxides of thorium, uranium, plutonium, neptunium, americium and curium.

8. The method of claim 4, wherein the at least one actinide oxide is a mixture comprising oxides of uranium, plutonium, neptunium, americium and curium.

9. The method of claim 4, wherein the at least one actinide oxide is a mixture comprising oxides of plutonium, neptunium, americium and curium.

10. The method of claim 1, wherein the period of time in step b) is at least 20 minutes.

11. The method of claim 1, wherein the period of time in step c) is at least 10 minutes.

12. The method of claim 1, wherein the period of time in step d) is at least 15 minutes.

13. The method of claim 1, wherein the period of time in step e) is at least 1 hour.

14. The method of claim 1, wherein the temperature in step b) is at least 0° C.

15. The method of claim 1, wherein the temperature in step c) is at least 20° C.

16. The method of claim 1, wherein the temperature in step d) is at least 300° C.

17. The method of claim 1, wherein the temperature in step e) is at least 500° C.

18. The method of claim 1, wherein the produced actinide mononitride is optionally mixed with zirconium mononitride.

* * * * *